US011973294B2

(12) United States Patent
Chen

(10) Patent No.: US 11,973,294 B2
(45) Date of Patent: Apr. 30, 2024

(54) ELECTRONIC SEAL HAVING SPRING ANTENNA

(71) Applicant: Chih-Chuan Chen, Nantou (TW)

(72) Inventor: Chih-Chuan Chen, Nantou (TW)

(*) Notice: Subject to any disclaimer, the term of this patent is extended or adjusted under 35 U.S.C. 154(b) by 140 days.

(21) Appl. No.: 17/864,360

(22) Filed: Jul. 13, 2022

(65) Prior Publication Data

US 2024/0022023 A1 Jan. 18, 2024

(51) Int. Cl.

| | |
|---|---|
| ***H01R 13/639*** | (2006.01) |
| ***H01Q 1/22*** | (2006.01) |
| ***H01Q 9/30*** | (2006.01) |

(52) U.S. Cl.

CPC ......... *H01R 13/639* (2013.01); *H01Q 1/2208* (2013.01); *H01Q 9/30* (2013.01)

(58) Field of Classification Search

CPC ....... H01R 13/639; H01Q 1/2208; H01Q 9/30

See application file for complete search history.

(56) References Cited

U.S. PATENT DOCUMENTS

| | | | | |
|---|---|---|---|---|
| 7,298,274 B2 * | 11/2007 | Chen | G09F 3/0376 | 340/572.1 |
| 8,319,647 B2 * | 11/2012 | Chen | G09F 3/0376 | 29/282 |
| 8,508,371 B2 * | 8/2013 | Lee | H01Q 1/2208 | 340/10.1 |
| 8,742,931 B2 * | 6/2014 | Lee | G06K 19/07798 | 340/572.1 |

* cited by examiner

*Primary Examiner* — Seung H Lee
(74) *Attorney, Agent, or Firm* — Leong C. Lei

(57) ABSTRACT

The present invention includes a plug bolt and a bolt seat. The plug bolt includes a bolt pin having an upper buckle and a receiving hole that receives a circuit device including an RFID chip and a lower contact point therein. The bolt seat includes a lower monopole antenna, a locking hole into which the bolt pin is insertable, and a lower buckle by which the upper buckle is positionable. The bolt pin is manipulatable to lock up with the bolt seat and set the lower monopole antenna and the lower contact point in electrical connection to activate the RFID chip. The lower monopole antenna includes a spring at a location corresponding to the locking hole. The spring provides preloading for keeping electrical connection between the lower monopole antenna and the lower contact point. The spring is set to match with a frequency band of a host device.

9 Claims, 8 Drawing Sheets

ELECTRONIC SEAL HAVING SPRING ANTENNA

TECHNICAL FIELD OF THE INVENTION

The present invention relates generally to a technology that uses a spring to server as a monopole antenna for an electronic seal.

DESCRIPTION OF THE PRIOR ART

Prior art, such as U.S. Pat. No. 10,510,272 issued to the present inventor, have certain drawbacks as follows:

(1) The prior art device includes a monopole antenna that is formed by bonding an aluminum sticker to a sliding-block of a bolt seat, and a spring is arranged to bias the sliding-block in order to maintain electrical connection with a circuit board of a plug bolt. The aluminum sticker has to be manually adjusted in order to adhesively bond to the sliding-block. This consumes a lot of working hours, and efficiency cannot be improved. It is particularly noted here that the spring that is adopted in the prior art device is not functioning as a lower monopole antenna, and is only functioning for preloading of the sliding-block.

(2) In the prior art, when the aluminum sticker is manually attached to the sliding-block, since the aluminum sticker is very thin and is susceptible to breaking, wrinkling, or shifting during the course of bonding. This would result in unreadability or difficulty of reading.

(3) In the prior art, the aluminum sticker must have a certain length in order to match with the length of the plug bolt and a frequency band of the host device. Thus, the sliding-block of the bolt seat must have a sufficient surface area for bonding the aluminum sticker. This makes it impossible to effectively reduce or shrink the size of the bolt seat and consequently it is not possible to lower down the material cost of the bolt seat.

(4) When the prior art device is applied to lock a movable door of a cargo container for transportation, the plug bolt is inevitably rotating by itself within a range of a cargo bolt hole as reaction to an acting force induced by transportation. Consequently, the bolt seat and the aluminum sticker are also caused to rotate by themselves. However, since the aluminum sticker is not arranged in a symmetric manner with respect to a plug pin or a bolt seat center axis line, the aluminum sticker may get close to or away from the door, resulting in an eccentrically positioning condition. This makes the lower monopole antenna relatively unstable in respect of frequency, leading to problems of being difficult to read or insufficient reading distance when read by the host device.

SUMMARY OF THE INVENTION

The primary contents of the present invention are that a spring is arranged at a location corresponding to a locking hole of a bolt seat in order to provide control of the spring in direct electrical connection with a circuit device when a bolt pin is applied to lock up with the bolt seat to activate a radio-frequency identification (RFID) chip. The spring provides preloading for the electrical connection and the spring is controlled and set to match with a host device frequency band. Such technical contents can greatly reduce working hours and enhance efficiency and can make achievement that meets economic principles with automatized production and effectively enhances quality, so as to alleviate, to a great extent, the defect problems of the prior art discussed above.

Other contents of the present invention are that the spring comprises a compression helical spring, and the compression helical spring and the bolt pin are arranged along a common center axis line, so as to make the compression helical spring symmetrically encompass and loop around the center axis line of the bolt pin, and making the compression helical spring not causing change of a relative position of the lower monopole antenna with respect to a movable door panel resulting from self-rotations of the bolt pin and the bolt seat, so as to effectively alleviate the drawbacks of frequency instability of a lower monopole antenna due to being eccentric and positional deviation of the prior art discussed above, allowing a host device to readily read and access, and therefore, the present invention provides improvement in respect of demonstrating high accuracy and precision.

DETAILED DESCRIPTION OF THE PREFERRED EMBODIMENT

Figure 1:
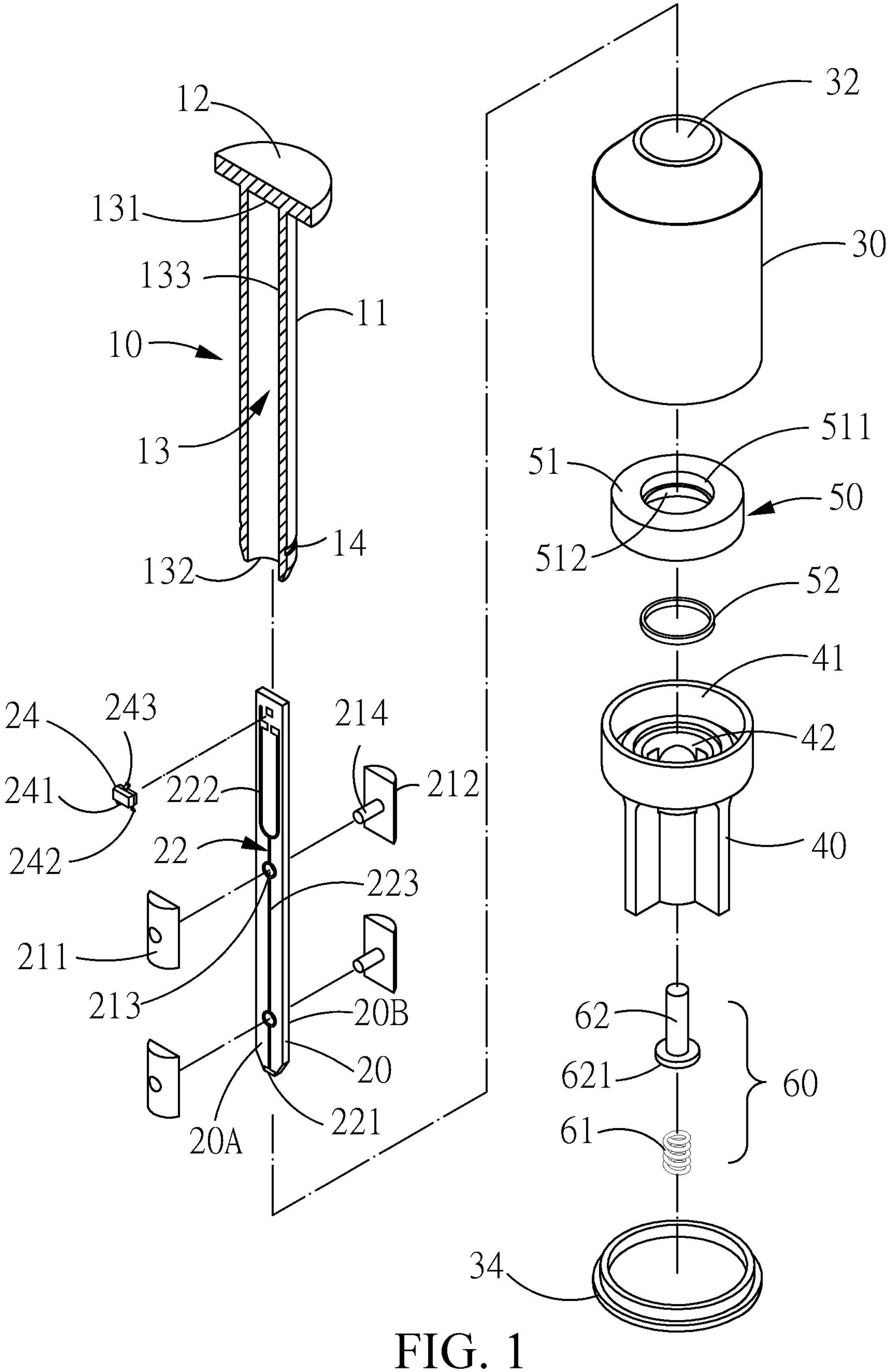
FIG. 1 is an exploded view of the present invention.
Figure 2:
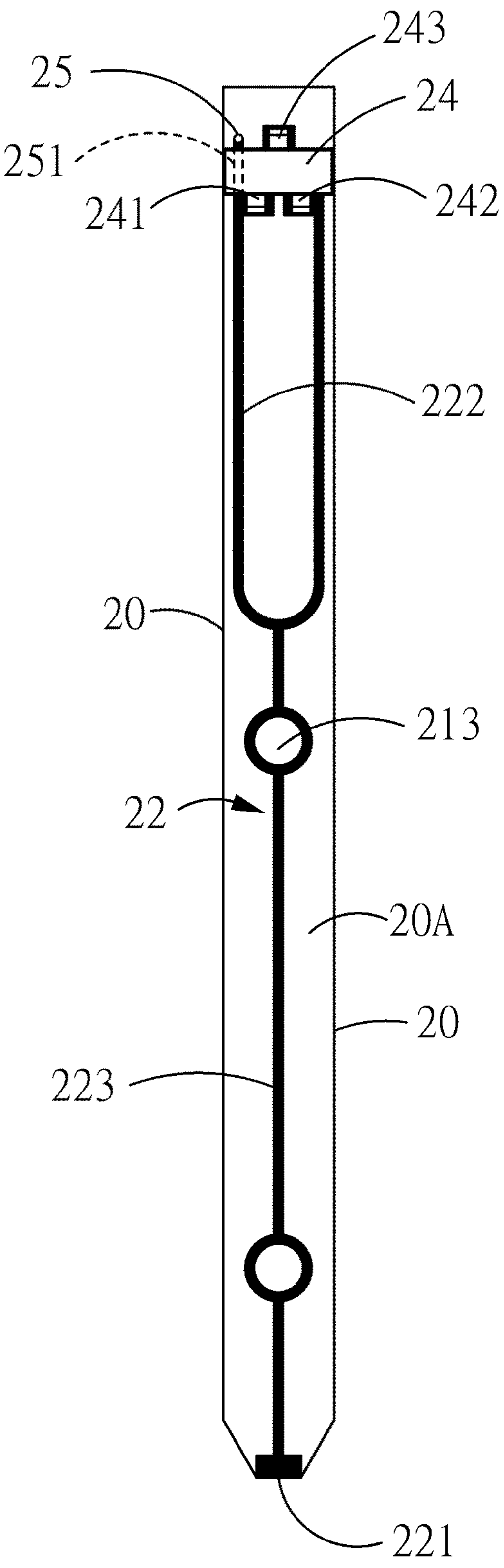
FIG. 2 is a schematic front view showing a circuit device of the present invention.
Figure 3:
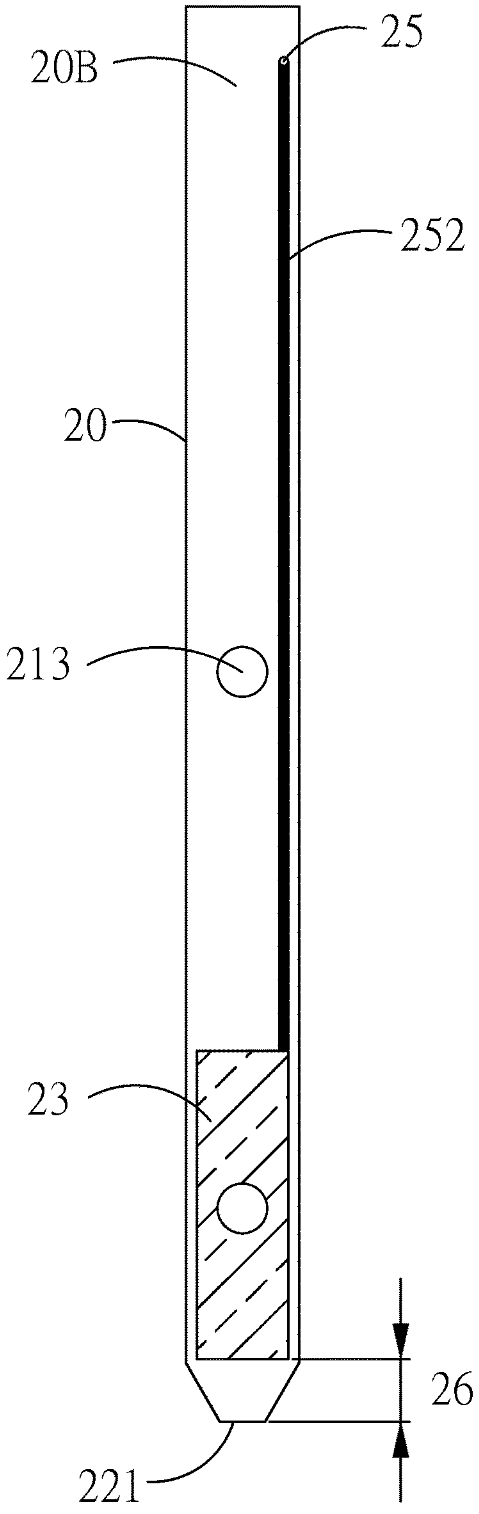
FIG. 3 is a schematic rear view showing the circuit device of the present invention.
Figure 4:
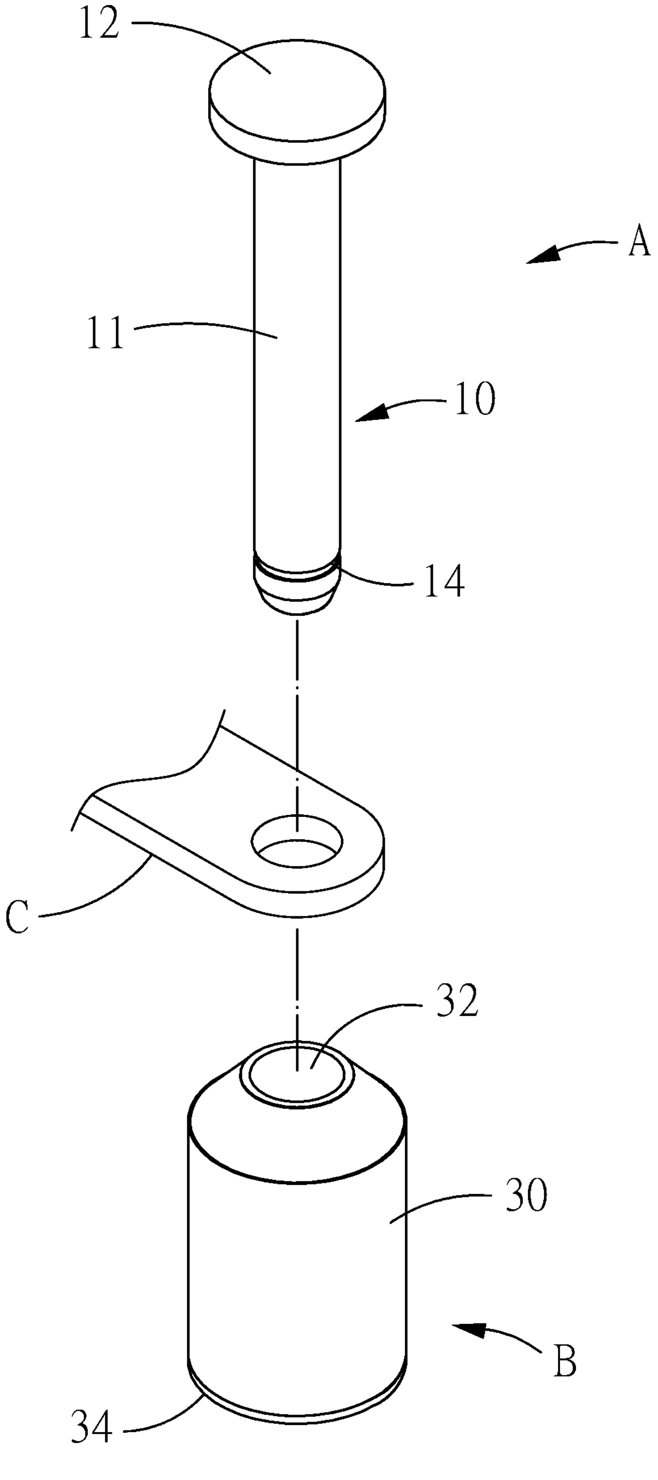
FIG. 4 is a schematic view showing relative positions among a bolt plug, a bolt seat, and a door latch according to the present invention.
Figure 5:
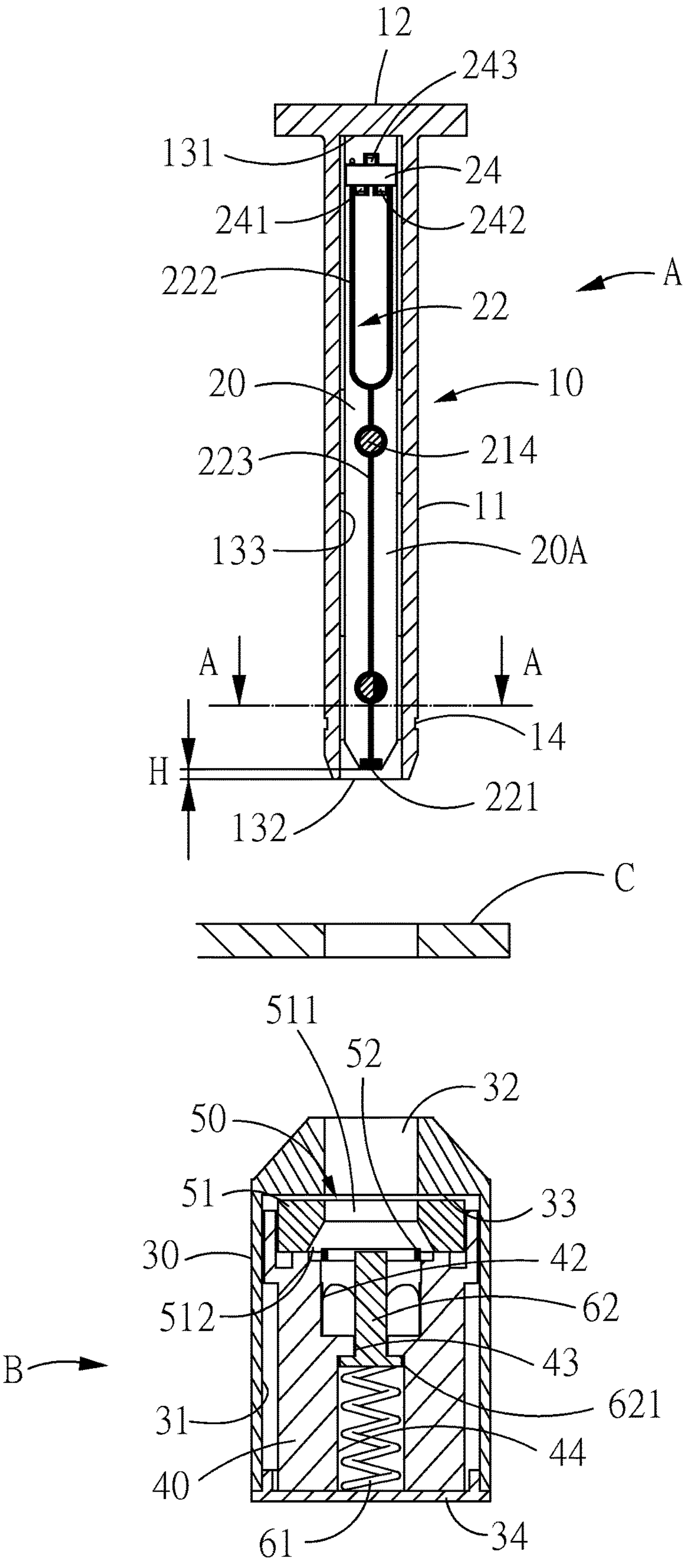
FIG. 5 is a cross-sectional view of FIG. 4.
Figure 6:
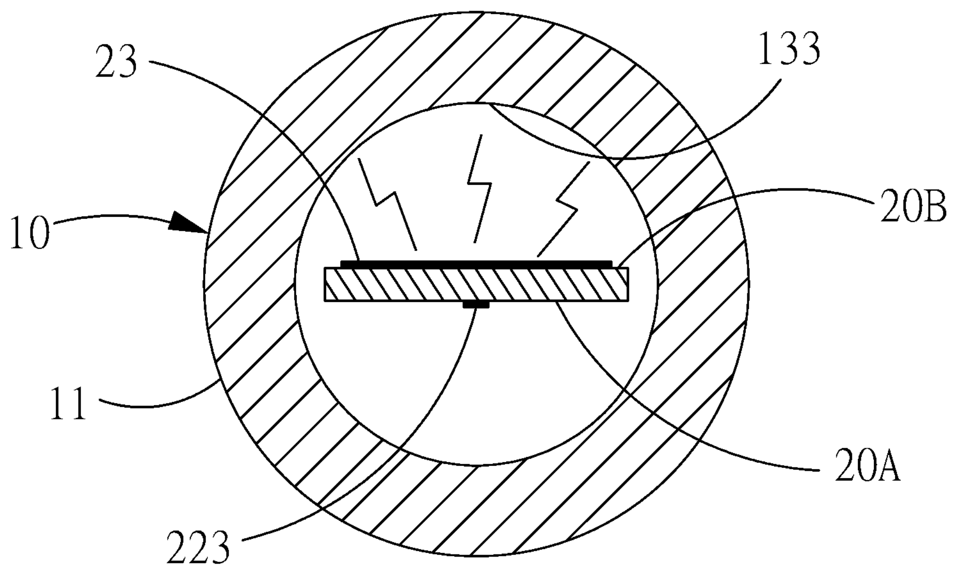
FIG. 6 is a cross-sectional view taken along line A-A of FIG. 5.

As shown in FIG. 4, an electronic seal according to the present invention is formed of a plug bolt A and a bolt seat B. The plug bolt A is operable or manipulatable, in a direction from top to bottom, to lock up the bolt seat B for being thereby mounted on a door latch C to close a movable door panel of a cargo container, so that a host device installed in a custom house or a warehouse may monitor if the movable door panel is normally opened during clearing through the custom to thereby identify if theft has occurred.

Referring to FIGS. 1-7, the plug bolt A comprises a bolt pin 10 having an interior in which a circuit device 20 is mounted.

The bolt pin 10 is made of an electrically conductive metallic material and comprises a rod body 11, a cap head 12 that is radially expanded and formed on a top end of the rod body 11, a receiving hole 13 that has an opening facing downward, and an upper buckle 14 that is formed through circumferentially recessing an outer circumference of a lower portion of the rod body 11. The receiving hole 13 is arranged in an axial direction of the rod body 11 and has a closed hole top 131, an open hole bottom 132, and a hole body 133 intermediating between the hole top 131 and the hole bottom 132. The hole bottom 132 communicates inside and outside of a bottom of the hole body 133.

The circuit device 20 defines a front surface 20A and a rear surface 20B that is opposite to the front surface 20A and is sized to insert, in a direction from bottom to top, into the receiving hole 13 and thus, fixed in the hole body 133 in a manner of being completely and internally concealed. The fixing is achieve in such a way that a male plug member 211 is arranged between the front surface 20A and one side of the hole body 133 and a female plug member 212 is arranged between the rear surface 20B and an opposite side of the hole body 133, and the circuit device 20 is formed with a through aperture 213, so that a pin member 214 fixes the male plug member 211 and the female plug member 212 on the circuit device 20, and the male plug member 211 and the female plug member 212 are clamped in a radial direction by the hole body 133 to thereby hold and securely fix the circuit device 20.

The circuit device 20 comprises a main circuit 22 arranged on the front surface 20A and a radiation unit 23 that is made in the form of a planar surface arranged on a bottom portion of the rear surface 20B. The main circuit 22 comprises a lower contact point 221 arranged on a bottom end of the circuit device 20, a matching circuit 222 arranged on a top portion of the circuit device 20, and a bridging circuit 223 arranged between the lower contact point 221 and a middle of the matching circuit 222, so that the matching circuit 222 and the bridging circuit 223 are distributed on a portion of the rod body 11 of a wide range in a longitudinal direction. Consequently, when the rod body 11 is cut off, the main circuit 22 is also broken in order to suit the need for detachability from the door latch C. Further, the present invention is structured so as to have the circuit device 20 fixed in the receiving hole 13 in a manner of being completely and internally concealed therein to thereby form and maintain a fitting zone H between the lower contact point 221 and the bottom of the receiving hole 13 to facilitate operations to be described hereinafter. The main circuit 22 and the radiation unit 23 are electrically connected to a radio-frequency identification (RFID) chip 24 to form a radio frequency circuit. The RFID chip 24 is arranged on a top of the front surface 20A and comprises a primary signal pin 241 connected to one end of the matching circuit 222, a secondary signal pin 242 connected to another end of the matching circuit 222, and a retaining pin 243 that provides additional supporting.

The circuit device 20 is formed with a conducting portion 25 in the form of a hole penetrating through a top portion thereof. The conducting portion 25 is extended, from a front end thereof, to form a front lead wire 251 connected to said one end of the matching circuit 222, and the conducting portion 25 is further extended, from a rear end thereof, to form a rear lead wire 252 connected to the radiation unit 23 to provide electrical connection among the RFID chip 24, the main circuit 22, and the radiation unit 23 and also to control formation of a separation zone 26 between the radiation unit 23 and the lower contact point 221 illustrated in FIG. 3 to prevent short-circuiting between the radiation unit 23 and the lower contact point 221, and the main circuit 22, the RFID chip 24, and the conducting portion 25 are not allowed to directly electrically contact the bolt pin 10 in order to prevent emission of signals due to erroneous contact between the circuit device 20 and the bolt pin 10. The present invention controls a surface area parameter of the radiation unit 23 that is the form of a planar surface and a relative position parameter of being located in the receiving hole 13 to make the radiation unit 23 inducing a coupling feed effect with respect to the hole body 133 in a manner of being not in contact engagement with the hole body 133 by means of which the bolt pin 10 forms an upper monopole antenna for the circuit device 20. The coupling feed effect is not a capacitive energy accumulation effect adopted in ordinary electronic circuits and is instead using a frequency response generated by the radiation unit 23 and the hole body 133 to achieve coupling feeding of signals of a radio-frequency circuit to transmit electromagnetic signals for realizing electrical connection with the hole body 133 of the bolt pin 10, and under this condition, the upper monopole antenna has only a relative low gain and cannot effectively activate the RFID chip 24. It is particularly noted herein that when the surface area of the radiation unit 23 exceeds the surface area parameter, it will directly induce an antenna effect, and at this moment, signals of the RFID chip 24 will be blocked inside the metallic receiving hole 13 and receiving and transmission of signals through the bolt pin 10 are not possible. Further, when the surface area of the radiation unit 23 is smaller than the surface area parameter, the radiation unit 23 cannot induce a frequency response with respect to the bolt pin 10, and consequently, it is also impossible to transmit and receive signals through the bolt pin 10.

The bolt seat B is formed of a housing 30, a base 40, a lower buckle 50, and a lower monopole antenna 60.

The housing 30 is generally of a cylindrical form and comprises a compartment 31 that is formed through being recessed in direction from bottom to top and a locking hole 32 that extends outwards from a top end of the compartment 31. A hole diameter of the locking hole 32 is large enough to receive a lower portion of the bolt pin 10 to insert therein and is smaller than an internal diameter of the compartment 31, so that a shoulder 33 is formed in the top end of the compartment 31. A bottom end of the compartment 31 is closed by mounting a bottom lid 34 thereto.

The base 40 is fixed in the compartment 31 and is positioned between the shoulder 33 and the bottom lid 34. The base 40 is formed with, in sequence from top to bottom, a first hole 41, a second hole 42, a third hole 43, and a fourth hole 44 that are in communication with each other and are coaxial with the locking hole 32. A hole diameter of the second hole 42 is set to correspond to the hole diameter of the locking hole 32 to receive the bottom end of the bolt pin 10 to insert therein. A hole diameter of the first hole 41 is greater than the hole diameter of the second hole 42 to receive the lower buckle 50, which will be described later, to be disposed therein. Further, a hole diameter of the third hole 43 is set to be smaller than the hole diameter of the second hole 42, and a hole diameter of the fourth hole 44 is larger than the hole diameter of the third hole 43. The third hole 43 and the fourth hole 44 may receive the lower monopole antenna 60, which will be further described later, to be mounted therein.

The lower buckle 50 is formed of a stop ring 51 and a clip ring 52. The stop ring 51 is located in the first hole 41 and has a top end positioned on the shoulder 33, and is formed with a fifth hole 511 that receives the bottom end of the bolt pin 10 to pass therethrough. A bottom of the fifth hole 511 is set in communication with and coaxial with a taper hole 512. The taper hole 512 has a hole diameter that is arranged to diverge in a downward direction. The clip ring 52 is mounted in a range of the taper hole 512 and has an external diameter that is greater than the second hole 42 and is arranged to form, when positioned opposite to the upper buckle 14, buckling engagement therewith, so that the clip ring 52 may prevent the bolt pin 10 from separating from the bolt seat B.

The lower monopole antenna 60 is formed of a spring 61 disposed in the fourth hole 44 and a slide block 62 slidably disposed in the third hole 43. The spring 61 is supported between and in contact engagement with the bottom lid 34 and a bottom of the slide block 62. The bottom of the slide block 62 is outward expanded in a radial direction to form a flange 621, and the spring 61 provides a preloading force acting on the slide block 62 to bias the flange 621 of the slide block 62 to be positioned against and constrained by a top end of the fourth hole 44 in order to maintain a top end of the slide block 62 to suspend in the interior of the second hole 42 for inserting into and fitting in the fitting zone H to match with the lower contact point 221. It is particularly noted here that the present invention further provides that the spring 61 is a compression helical spring, and the compression helical spring and the bolt pin 10 are arranged along a common center axis line, so that the compression helical spring is arranged to loop around the center axis line of the bolt pin 10 in a symmetric manner and the compression helical spring does not cause a change of the position of the lower monopole antenna 60 relative to the movable door panel due to rotation of the bolt pin 10 and the bolt seat B. More importantly, the present invention further provides that an overall length of the spring 61 is set to match a frequency band of monitoring conducted by the host device. Such an overall length is defined as a dimension of the spring 61 under a condition of being stretched to a straight line. Specifically, the overall length of the spring 61 and the host device frequency band are set as one eighth wavelength. Further, the light speed divided by the host device frequency is the wavelength, and a monopole antenna, without metal shielding, has an optimum frequency response in a quarter wavelength. The present invention is applied to a movable door panel that has a large surface of metal, so that the frequency response of the lower monopole antenna 60 is caused to shift toward around one eighth wavelength. Since the spring 61 according to the present invention is not caused by the rotation of the bolt pin 10 and the bolt seat B to become eccentric and result in positional deviation, so that fixed frequency response can be realized for a frequency band that is wide enough to cover the host device frequency band for American and European standards.

Figure 7:
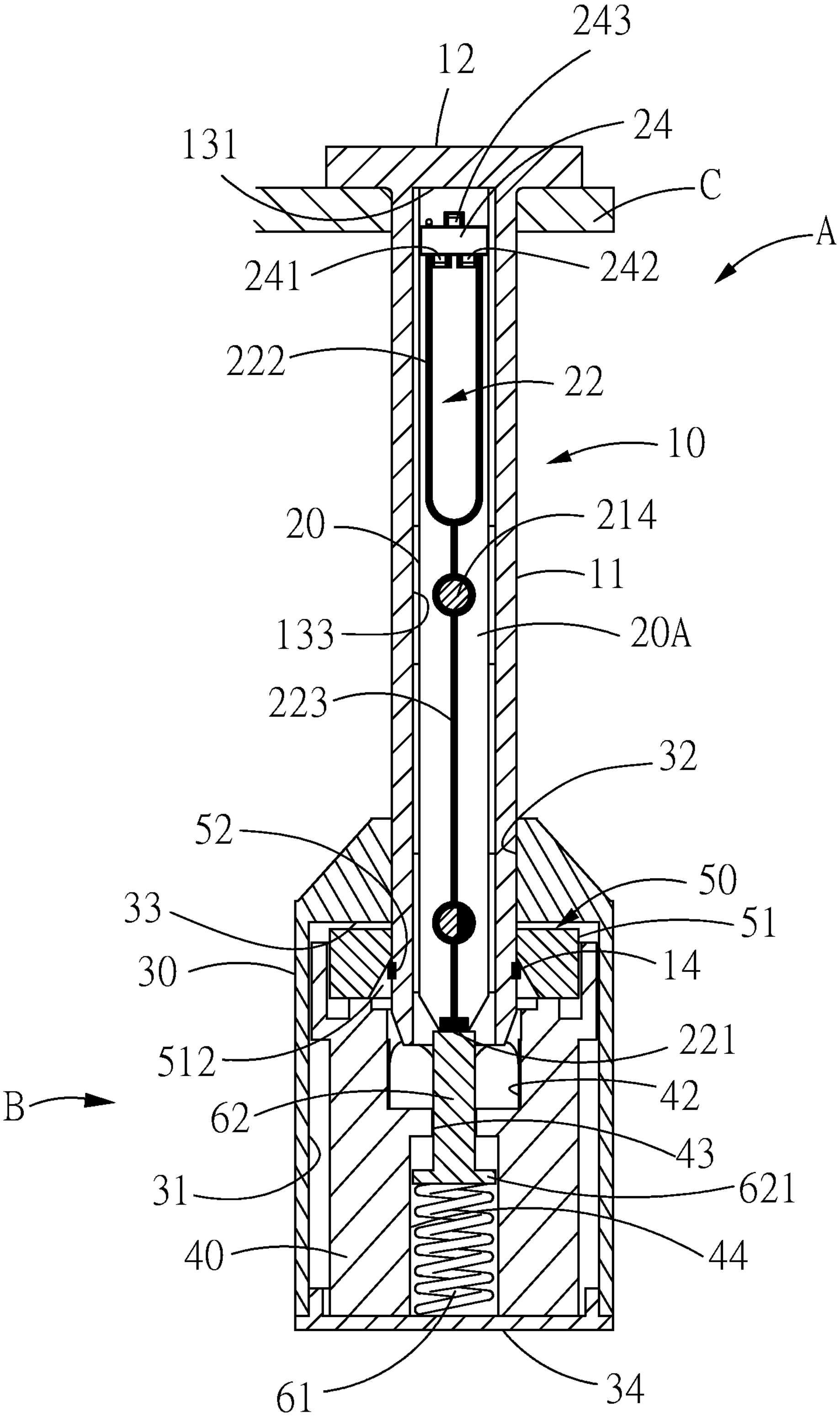
FIG. 7 is an assembled view of FIG. 5.
Figure 8:
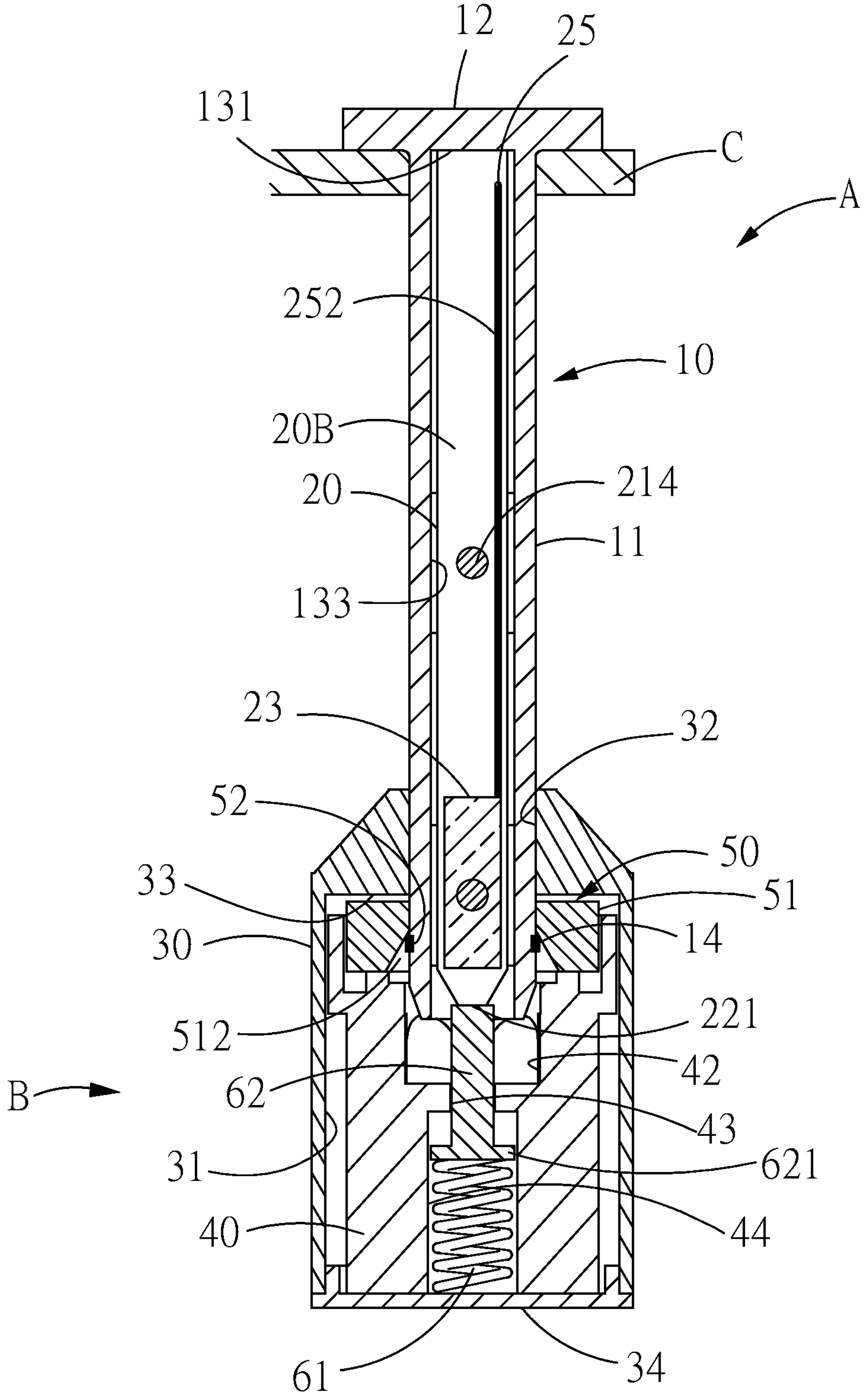
FIG. 8 is a schematic view showing a position of a radiation unit when the bolt plug and the bolt seat according to the present invention are locked together.
Figure 9:
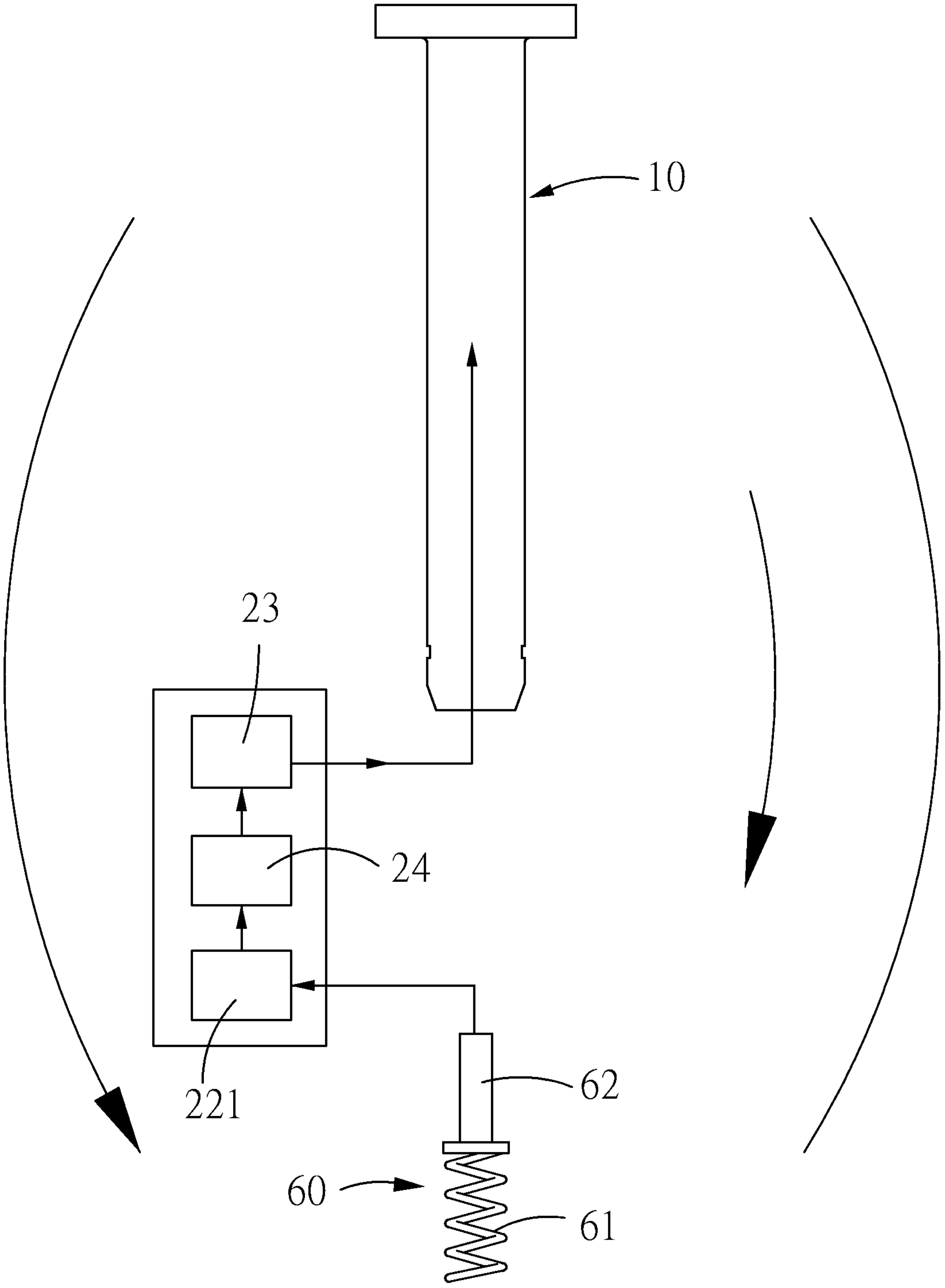
FIG. 9 is a schematic view illustrating operation of electromagnetic wave in a standard dipole antenna mode formed of the present invention.

Referring to FIGS. 4-7, when the lower portion of the bolt pin 10 is to be inserted into the locking hole 32 for mounting to the door latch C, during the course of the lower portion of the bolt pin 10 being continuously inserted into the locking hole 32, the top end of the slide block 62 is caused to move into the fitting zone H to contact the lower contact point 221, and subsequently, the lower portion of the bolt pin 10 is forced to overcome the preloading of the spring 61 to further insert into the locking hole 32 to allow the upper buckle 14 to get into retaining engagement with and positioned in the lower buckle 50 to thereby have the bolt pin 10 locked up with the bolt seat B without departing therefrom, and the top end of the slide block 62 set and kept in electrical connection with the lower contact point 221, so that the spring 61 and the slide block 62 jointly form the lower monopole antenna 60 that may activate the RFID chip 24 for gain enhancement for the upper monopole antenna, and therefore, the upper monopole antenna and the lower monopole antenna 60 are combined to form a standard dipole antennal as shown in FIGS. 8 and 9, which is capable of emitting a signal of an RFID frequency band or a microwave frequency band identifiable and manageable by the host device to thereby ensure effective monitoring and controlling of closure of the movable door panel of a cargo container. To opening the movable door panel in a normal way, hydraulic scissors are applied to cut off the bolt pin 10 at a middle portion to break up the main circuit 22 and thus terminating the signal. It is particularly noted here that the present invention is equally operable in a way as to application of the coupling feed effect between the radiation unit 23 and the hole body 133 by controlling setting of a surface area parameter and setting of a distance parameter of the lower contact point 221 and the top end of the lower monopole antenna 60, so as to, when the bolt pin 10 locks up the bolt seat B, control the lower contact point 221 and the top end of the lower monopole antenna 60 to induce a coupling feed effect without being put in contact with each other, to allow the lower contact point 221 to transmit an electromagnetic wave signal to the top end of the lower monopole antenna 60 for mutual electrical connection therebetween.

The present invention provides the following advantages:

(1) The present invention provides an overall arrangement involving the plug bolt, the bolt seat, the locking hole, and the spring, so that the lower monopole antenna can be mounted, in an automatized manner, to a predetermined position in the bolt seat, and this is apparently more effective and more efficient than the manual operation adopted in the prior art discussed above, and the present invention provides improvement that is of an economic effectiveness.

(2) The present invention eliminates an operation step of manually bonding a lower monopole antenna, and certainly, this offers accuracy and precision that are better than those achieved with manual bonding, and may avoids defects resulting from hurry, absent-mindedness, carelessness, emotional instability, and unskillfulness of the operators.

(3) The present invention provides that the spring and the bolt pin are arranged along the same center axis line so as to make the spring arranged in a manner of symmetrically encompassing the center axis line of the bolt pin, and thus, the spring does not cause a change of a relative position of the lower monopole antenna with respect to a movable door panel due to self-rotations of the bolt pin and the bolt seat, so as to effectively and surely alleviate the drawbacks of becoming eccentric and positional deviation discussed above, and better stabilize frequency accuracy of the lower monopole antenna according to the present invention.

To further improve the identifiability of the present invention, it is feasible to add a second RFID chip at a proper location and to maintain the second RFID chip and the circuit device constantly in electrical connection, so that when the bolt pin is broken by hydraulic scissors to interrupt a signal of the RFID chip 24 shown in FIG. 7, the second RFID chip still emits a comparison signal, so that an operator may easily identify whether or not the electronic seal is destructed or malfunctioning.

I claim:

1. A spring-antenna electronic seal, at least comprising:

a plug bolt, which comprises a bolt pin and circuit device, the bolt pin comprising an upper buckle and a receiving hole in which the circuit device is disposed, the circuit device comprising a radio-frequency identification (RFID) chip and a lower contact point; and a bolt seat, in which a lower monopole antenna is arranged and which is formed with a locking hole into which a lower portion of the bolt pin is insertable and is provided with a lower buckle for positioning of the upper buckle, so that the bolt pin is manipulatable to lock up with the bolt seat to control electrical connection between the lower monopole antenna and the lower contact point so as to activate the RFID chip, wherein the lower monopole antenna comprises, at least, a spring, and the spring is arranged at a location corresponding to the locking hole, the spring providing preloading to form the electrical connection between the lower monopole antenna and the lower contact point, the spring being set to match a host device frequency band.

2. The spring-antenna electronic seal according to claim 1, wherein the spring is set to match the host device frequency band by controlling an overall length thereof, and the overall length is defined as a dimension of the spring in a condition of being stretched to a straight line.

3. The spring-antenna electronic seal according to claim 2, wherein the overall length of the spring and the host device frequency band are set to be one eighth wavelength.

4. The spring-antenna electronic seal according to claim 3, wherein the spring comprises a compression helical spring, and the compression helical spring and the bolt pin are arranged on a common center axis line, so that the compression helical spring symmetrically encompass a center axis line of the bolt pin.

5. The spring-antenna electronic seal according to claim 3, wherein the lower monopole antenna further comprises a slide block slidably arranged in the bolt seat, and the spring biases the slide block so as to set the slide block to position, in a suspended form, in the locking hole for electrical connection with the lower contact point.

6. The spring-antenna electronic seal according to claim 2, wherein the spring comprises a compression helical spring, and the compression helical spring and the bolt pin are arranged on a common center axis line, so that the compression helical spring symmetrically encompass a center axis line of the bolt pin.

7. The spring-antenna electronic seal according to claim 2, wherein the lower monopole antenna further comprises a slide block slidably arranged in the bolt seat, and the spring biases the slide block so as to set the slide block to position, in a suspended form, in the locking hole for electrical connection with the lower contact point.

8. The spring-antenna electronic seal according to claim 1, wherein the spring comprises a compression helical spring, and the compression helical spring and the bolt pin are arranged on a common center axis line, so that the compression helical spring symmetrically encompass a center axis line of the bolt pin.

9. The spring-antenna electronic seal according to claim 1, wherein the lower monopole antenna further comprises a slide block slidably arranged in the bolt seat, and the spring biases the slide block so as to set the slide block to position, in a suspended form, in the locking hole for electrical connection with the lower contact point.

* * * * *